(12) United States Patent
Ide (10) Patent No.: US 8,143,837 B2
(45) Date of Patent: Mar. 27, 2012

(54) INVERTER CONTROL APPARATUS (75) Inventor: Kozo Ide, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 262 days.

(21) Appl. No.: 12/709,522

(22) Filed: Feb. 22, 2010

(65) Prior Publication Data
US 2010/0164429 A1 Jul. 1, 2010

Related U.S. Application Data (63) Continuation of application No. PCT/JP2008/063869, filed on Aug. 1, 2008.

(30) Foreign Application Priority Data

Sep. 27, 2007 (JP) ................................. 2007-250420

(51) Int. Cl.
*H02P 27/08* (2006.01)
(52) U.S. Cl. ........ 318/802; 318/798; 318/799; 318/800; 318/801; 318/727

(58) Field of Classification Search .................. 318/802, 318/798–801, 727, 767
See application file for complete search history.

(56) References Cited

U.S. PATENT DOCUMENTS 7,400,102 B2 * 7/2008 Hobraiche et al. ......... 318/254.1
7,504,797 B2 * 3/2009 Tomigashi et al. ........... 318/807

FOREIGN PATENT DOCUMENTS

| JP | 08-084499 | 3/1996 |
| JP | 08-223998 | 8/1996 |
| JP | 2005-020817 | 1/2005 |

* cited by examiner

*Primary Examiner* — Bentsu Ro
*Assistant Examiner* — David Luo
(74) *Attorney, Agent, or Firm* — Ditthavong Mori & Steiner, P.C.

(57) ABSTRACT

An inverter control apparatus includes: a state estimator that calculates an estimated current vector and an estimated magnetic flux vector from a motor command voltage vector, a detected current vector, and a motor parameter; a correction voltage calculator that calculates a correction voltage vector on the basis of a current error between the detected current vector and the estimated current vector; and a correction voltage unit that adds the correction voltage vector to the motor command voltage vector.

6 Claims, 7 Drawing Sheets

START
↓
CONTROL VOLTAGE TO OBTAIN COMMAND VOLTAGE VECTOR $u_{s0}^{ref}$, AND CALCULATE COMMAND VOLTAGE VECTOR $u_s^{ref}$ ON THE BASIS OF THIS — STEP ST1
↓
DETERMINE WHETHER OPERATING STATE OF DRIVEN MOTOR IS AT ELECTRICAL OPERATION OR AT REGENERATION — STEP ST2
↓
CALCULATE CORRECTION VECTOR $u_s^\Delta$ — STEP ST3
↓
CONVERT VOLTAGE VECTOR $(u_s^{ref} + u_s^\Delta)$ INTO TWO-PHASE VECTOR $u_{s1}^{ref}$ — STEP ST4
↓
ESTIMATE AND CALCULATE CURRENT VECTOR $i_{s1}{\char`\^}$, MAGNETIC FLUX VECTOR $\phi_r{\char`\^}$, AND MAGNETIC FLUX PHASE $\theta{\char`\^}$ — STEP ST5
↓
CALCULATE ERROR CURRENT VECTOR $\Delta i$ — STEP ST6
↓
PERFORM PWM CONTROL ON COMMAND VOLTAGE VECTOR $u_s^{ref}$ AND APPLY VOLTAGE TO MOTOR, TO DRIVE MOTOR — STEP ST7
↓
END

US 8,143,837 B2

INVERTER CONTROL APPARATUS

CROSS-REFERENCE TO RELATED APPLICATION

The present application is a continuation application of PCT/JP2008/063869, filed Aug. 1, 2008, which claims priority to Japanese Patent Application No. 2007-250420, filed Sep. 27, 2007. The contents of these applications are incorporated herein by reference in their entirety.

BACKGROUND OF THE INVENTION

1. Field of the Invention

The present invention relates to an inverter control apparatus that drives an induction motor without using a position sensor and a velocity sensor.

2. Discussion of the Background

As an inverter control apparatus that drives an induction motor without using a velocity sensor, there is known a method using a flux observer as a state estimator. The difference between an estimated current estimated by the state estimator and an actual current is obtained, and the integral quantity of the scalar product of this difference and the estimated current is used as a temperature change amount.

For example, Japanese Unexamined Patent Application Publication No. 2005-20817 discloses that, during operation of an induction motor, the integral quantity of a scalar product is obtained, and a primary resistance value used in a state estimator is corrected, thereby performing a high-performance operation.

In the control apparatus, first, a set constant concerning temperature change in an arithmetic expression of the state estimator is directly changed by using a temperature change amount obtained during operation of the induction motor. Thus, calculation becomes complicated. In addition, it is difficult to take into consideration noise component removal, addition of a limiter, and the like.

Second, in calculation of the scalar product of an estimated current and a detected current that are two-phase alternating current signals, a phase difference occurs between the both signals due to a delay of detection timing of current, a delay of estimation calculation, and the like. Thus, a temperature change amount becomes different from the true value, and deterioration of control cannot be suppressed.

Third, at a regeneration state of the motor, a compensation direction needs to be inverted, but it is not taken into consideration.

An object of the invention is to provide: an inverter control apparatus that suppresses deterioration of control, which is caused by a temperature change and a setting error of a constant for a motor, and achieves stable drive of the motor; and a control method thereof.

SUMMARY OF THE INVENTION

According to one aspect of the present invention, an inverter control apparatus includes: a state estimator that estimates a current vector and a magnetic flux vector from a motor command voltage vector, a detected current vector, and a motor parameter; a correction voltage calculator that calculates a correction voltage vector on the basis of a current error between the detected current vector and the estimated current vector; and a correction voltage unit that adds the correction voltage vector to the motor command voltage vector.

According to another aspect of the present invention, an inverter control method includes: calculating an estimated current vector and an estimated magnetic flux vector from a motor command voltage vector, a detected current vector, and a motor parameter; calculating a correction voltage vector on the basis of a current error between the detected current vector and the estimated current vector; and performing correction by adding the correction voltage vector to the motor command voltage vector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments will now be described with reference to the accompanying drawings, wherein like reference numerals designate corresponding or identical elements throughout the various drawings.

A generally used state estimator is configured as in Formula (1) by using a current vector $i_{s1}$, a voltage vector $u_{s1}^{ref}$, and a magnetic flux vector $\phi_r$ in an $\alpha$–$\beta$ (static) coordinate system, a primary resistance Rs, a primary-converted secondary resistance Rr', a primary-converted mutual inductance M', a leakage inductance $\sigma$Ls, a primary self-inductance Ls, a secondary self-inductance Lr, a secondary time constant Tr, a rotor angular velocity $\omega r$, a stator angular velocity $\omega$, and an observer feedback gain L, which are motor parameters. It is noted that the symbol "^" indicates an estimated value and the superscript "ref" indicates a command value.

$$\frac{d}{dt}\begin{bmatrix} \hat{i}_{s1} \\ \hat{\phi}_r \end{bmatrix} = \begin{bmatrix} a_{r11} & a_{r12} - j\rho\hat{\omega}_r \\ a_{r21} & a_{r22} + j\hat{\omega}_r \end{bmatrix}\begin{bmatrix} \hat{i}_{s1} \\ \hat{\phi}_r \end{bmatrix} + \begin{bmatrix} b_s \\ 0 \end{bmatrix}u_{s1}^{ref} + L(i_{s1} - \hat{i}_s) \quad (1)$$

$$i_{s1} = i_{s\alpha} + j \cdot i_{s\beta},$$

$$u_{s1}^{ref} = u_{s\alpha}^{ref} + j \cdot u_{s\beta}^{rer},$$

$$\hat{\phi}_r = \hat{\phi}_{r\alpha} + j \cdot \hat{\phi}_{r\beta}$$

$$a_{r11} = -\frac{1}{\sigma L_s}(R_s + R'_r),$$

$$a_{r12} = \frac{R'_r}{\sigma L_s M},$$

$$\rho = \frac{M}{\sigma L_s L_r},$$

$$a_{r21} = \frac{M}{T_r},$$

-continued $$a_{r22} = -\frac{1}{T_r},$$

$$b_s = \frac{1}{\sigma L_s}$$

Figure 1:
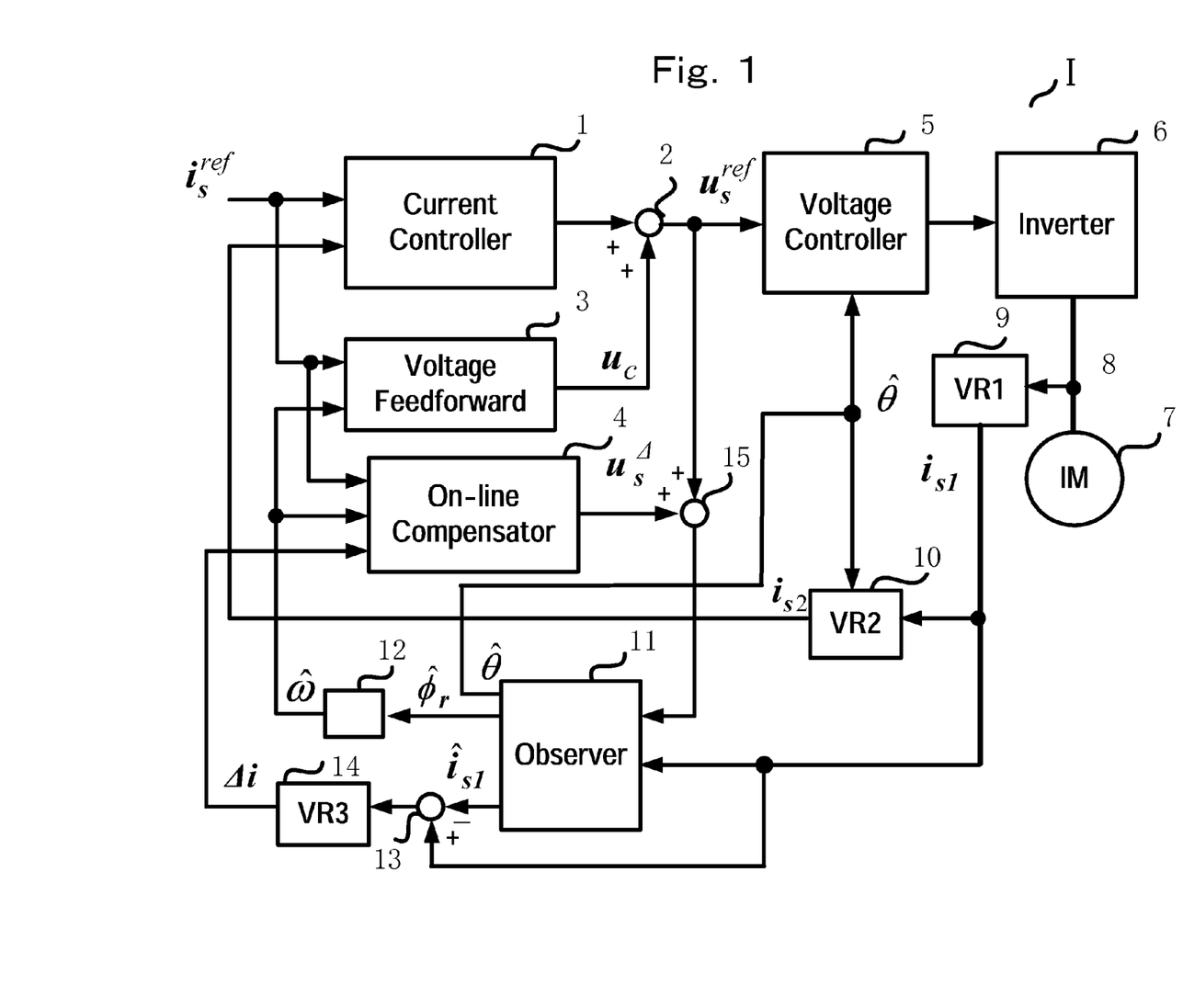
FIG. 1 is a block diagram of an inverter control apparatus I according to a first embodiment.

FIG. 1 is a block diagram of an inverter control apparatus I according to a first embodiment of the invention.

The control apparatus I includes: an induction motor 7; a current detector 8 that detects a motor current (phase current) flowing in the induction motor 7; a first vector converter 9 that performs three-phase/two-phase conversion to obtain the current vector $i_{s1}$; and a second vector converter 10 that performs d-q conversion on the current vector $i_{s1}$ by using a magnetic flux phase $\hat{\theta}$ to obtain a current vector $i_{s2}$.

Further, the control apparatus I includes: a correction voltage calculator 4 that outputs a later-described correction voltage vector $u_s^\Delta$; and a voltage controller 5 that converts a later-described command voltage vector $u_s^{ref}$ into a command phase voltage, performs on-delay compensation such that a voltage is outputted as commanded, and outputs the resultant command phase voltage to an inverter unit 6.

Further, the control apparatus I includes: a state estimator 11 that estimates and calculates a current vector $\hat{i}_{s1}$, a magnetic flux vector $\hat{\phi}_r$, and the magnetic flux phase $\hat{\theta}$ on the basis of the motor parameters of the induction motor 7, the current vector $i_{s1}$, and the voltage vector $u_{s1}^{ref}$; and an angular velocity estimator 12 that estimates a stator angular velocity $\hat{\omega}$ from the estimated magnetic flux vector $\hat{\phi}_r$.

Further, the control apparatus I includes: an error current calculator 13 that calculates the difference between the current vector $i_{s1}$ and the estimated current vector $\hat{i}_{s1}$; an error current converter 14 that performs d-q conversion on the output of the error current calculator 13 and outputs the result as an error current vector $\Delta i$; and an adder 15 that outputs to the state estimator 11 a vector ($u_s^{ref}+u_s^\Delta$) that is obtained by adding the correction voltage vector $u_s^\Delta$ to the command voltage vector $u_s^{ref}$.

Further, the control apparatus I includes: a current controller 1 that performs control such that a command current vector $i_s^{ref}$ agrees with the current vector $i_{s2}$, which is the output of the second vector converter 10, and that outputs a command voltage vector $u_{s0}^{ref}$; and the inverter unit 6 that performs PWM control on the basis of the command voltage vector $u_s^{ref}$ and applies a voltage to the induction motor 7.

It is noted that, according to need, the control apparatus I includes: an adder 2 that adds a forward compensation vector $u_c$ outputted by a forward compensator 3, to the command voltage vector $u_{s0}^{ref}$ outputted by the current controller 1; and the forward compensator 3 that calculates the command voltage vector $u_s^{ref}$.

In addition to the calculation shown in the above Formula (1), the state estimator 11 converts the voltage vector ($u_s^{ref}+u_s^\Delta$), which is inputted to Formula (1), into a voltage vector $u_{s1}^{ref}$ that is a two-phase alternating current vector, on the basis of Formula (2) and by using the magnetic flux phase $\hat{\theta}$.

$$u_{s1}^{ref} = \begin{bmatrix} \cos\hat{\theta} & -\sin\hat{\theta} \\ \sin\hat{\theta} & \cos\hat{\theta} \end{bmatrix} \cdot (u_s^{ref} + u_s^\Delta) \quad (2)$$

As described above, the corrected command voltage vector is inputted to the state estimator 11.

The current vector $i_{s1}$, the estimated current vector $\hat{i}_{s1}$, and the error current vector, which is the output of the error current calculator 13, are two-phase alternating current vectors. The error current converter 14 calculates the error current vector $\Delta i$ by performing d-q conversion on the basis of Formula (3).

$$\Delta i = \begin{bmatrix} \Delta i_d \\ \Delta i_q \end{bmatrix} = \begin{bmatrix} \cos\hat{\theta} & \sin\hat{\theta} \\ -\sin\hat{\theta} & \cos\hat{\theta} \end{bmatrix} \begin{bmatrix} i_{s\alpha} - \hat{i}_{s\alpha} \\ i_{s\beta} - \hat{i}_{s\beta} \end{bmatrix} \quad (3)$$

The angular velocity estimator 12 estimates and calculates the stator angular velocity $\hat{\omega}$ on the basis of Formula (4) and by using the magnetic flux vector $\hat{\phi}_r$ estimated by the state estimator 11.

$$\hat{\omega} = \frac{\hat{\phi}_{r\alpha}\frac{d}{dt}\hat{\phi}_{r\beta} - \hat{\phi}_{r\beta}\frac{d}{dt}\hat{\phi}_{r\alpha}}{\hat{\phi}_{r\alpha}^2 + \hat{\phi}_{r\beta}^2} \quad (4)$$

Figure 2:
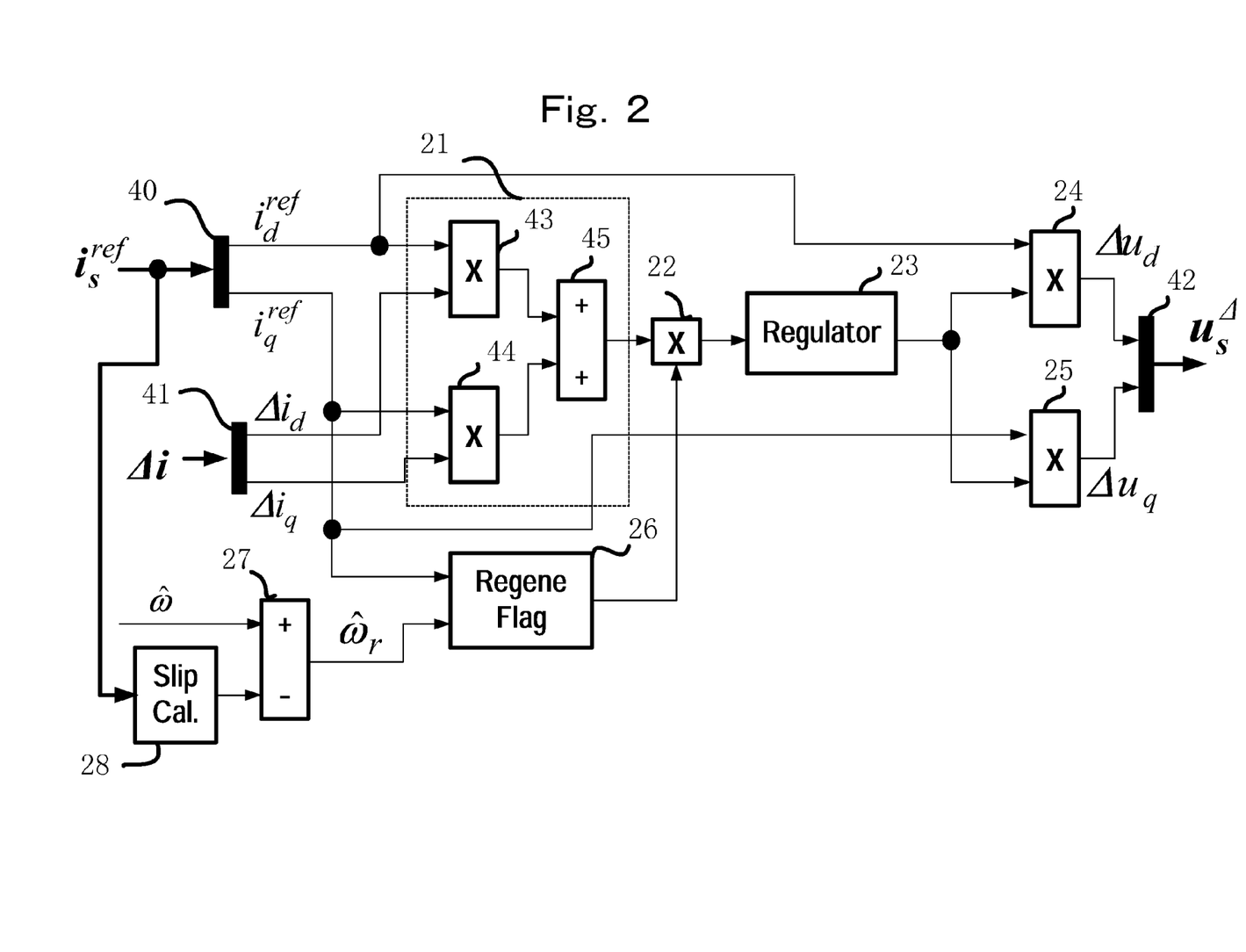
FIG. 2 illustrates a correction voltage calculator according to the first embodiment.

Next, a process at the correction voltage calculator 4 will be described with reference to FIG. 2. As shown in FIG. 2, the correction voltage calculator 4 includes: a scalar product calculator 21 that includes multipliers 43 and 44 and an adder 45; multipliers 22, 24, and 25; a correction voltage adjuster 23; an electrical operation/regeneration determiner 26; a subtractor 27; a slip angle frequency calculator 28; vector resolvers 40 and 41; and a vector combiner 42.

The vector resolvers 40 and 41 resolve the command current vector $i_s^{ref}$ and the error current vector $\Delta i$, respectively, into d components and q components.

The scalar product calculator 21 receives the d component and the q component of the command current vector $i_s^{ref}$ and the d component and the q component of the error current vector $\Delta i$, and calculates a scalar product by using the multipliers 43 and 44 and the adder 45.

The slip angle frequency calculator 28 calculates a slip angle frequency $\omega_s$ by using the command current vector $i_s^{ref}$, and the subtractor 27 subtracts the slip angle frequency $\omega_s$ from the stator angular velocity $\hat{\omega}$ to calculate a rotor angular velocity $\hat{\omega}_r$.

The electrical operation/regeneration determiner 26 determines whether the operating state of the motor is at electrical operation or at regeneration, on the basis of the rotor angular velocity $\hat{\omega}_r$ and a current $i_q^{ref}$ corresponding to a torque command current. The electrical operation/regeneration determiner 26 outputs 1 in the case of electrical operation, and outputs -1 in the case of regeneration. This process will be described later.

The multiplier 22 outputs to the correction voltage adjuster 23 a value that is obtained by multiplying the output of the scalar product calculator 21 by the output of the electrical operation/regeneration determiner 26. The correction voltage adjuster 23 obtains a correction voltage value by summing the inputted value, and outputs the correction voltage value. By the correction voltage value being properly corrected, the inputted value of the correction voltage adjuster 23 converges into zero.

The multiplier 24 multiplies the correction voltage value by the d component of the command current vector $i_s^{ref}$. The multiplier 25 multiplies the correction voltage value (coefficient) by the q component of the command current vector $i_s^{ref}$. The vector combiner 42 combines the outputs of the multipliers 24 and 25 into a vector having d and q components, and outputs the vector as a correction voltage vector $u_s^\Delta$.

As described above, the correction voltage calculator 4 changes the sign depending on whether the operating state of the motor is at electrical operation or at regeneration, and calculates the correction voltage vector $u_s^\Delta$.

Figure 3:
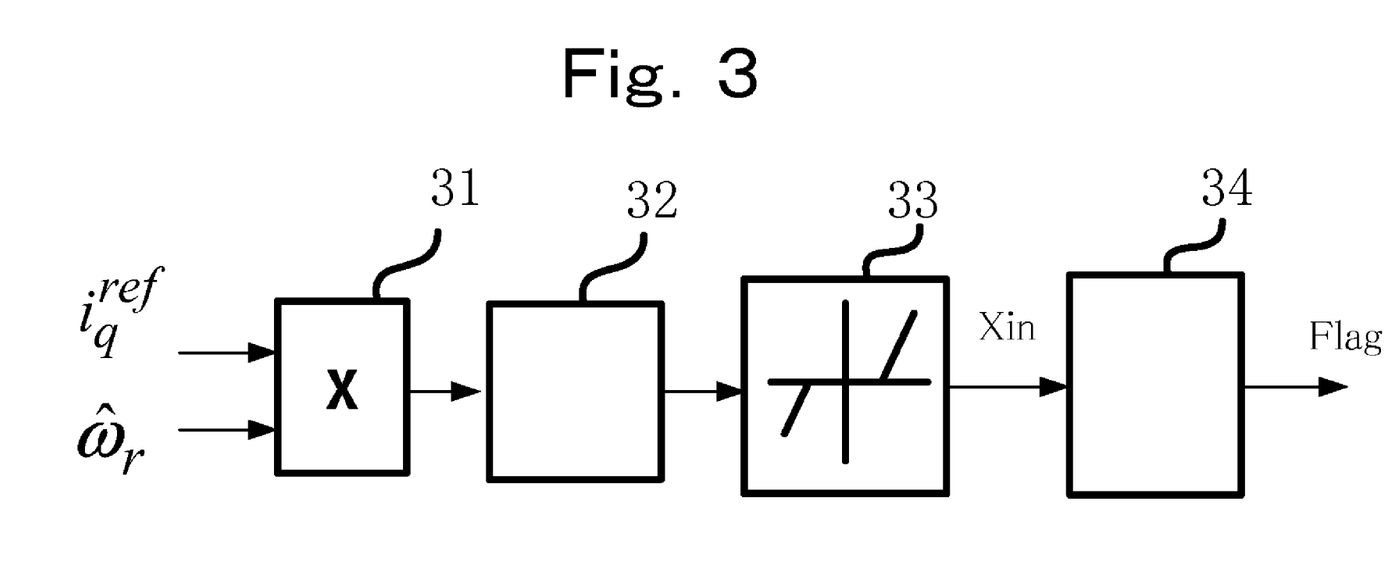
FIG. 3 illustrates an electrical operation/regeneration determiner according to the first embodiment.

Next, the process at the electrical operation/regeneration determiner 26 will be described with reference to FIG. 3. As shown in FIG. 3, the electrical operation/regeneration determiner 26 includes a multiplier 31, a torque coefficient unit 32, a dead zone processor 33, and a sign determiner 34.

The multiplier 31 calculates the product of: the current $i_q^{ref}$ corresponding to the torque command current; and the rotor angular velocity $\omega_r\hat{}$. The torque coefficient unit 32 multiplies the output of the multiplier 31 by a coefficient to convert the output into a secondary electrical power. The dead zone processor 33 is provided for preventing chattering at switching of the electrical operation/regeneration determination and at low load. The sign determiner 34 determines whether the operating state of the motor is at electrical operation or at regeneration, on the basis of the sign of the output of the dead zone processor 33. The sign determiner 34 outputs 1 in the case of electrical operation, and outputs −1 in the case of regeneration.

As described above, in the electrical operation/regeneration determiner 26, the operating state (electrical operation, regeneration) of the motor is determined on the basis of the sign of the product of the torque current and the rotor angular velocity.

Next, the necessity of taking into consideration the operating state (electrical operation, regeneration) of the motor when calculating the correction voltage vector $u_s^\Delta$, will be described.

First, a voltage fall due to the primary resistance $R_s$ and the leakage inductance $\sigma L_s$ on the primary side, and an estimated induction voltage vector value $\hat{e}$, will be described briefly.

A voltage vector $u_{s1}^{ref}$ that is obtained by converting the voltage vector inputted to the state estimator 11 into a d-q coordinate system, is represented by Formula (5) using the voltage fall due to the primary resistance $R_s$ and the leakage inductance $\sigma L_s$ on the primary side and the estimated induction voltage vector value $\hat{e}$. The estimated induction voltage vector value $\hat{e}$ is a value corresponding to the product of: an estimated value $\hat{\omega}$ of the stator angular velocity; and the estimated magnetic flux vector $\hat{\phi_r}$. The symbol "*" indicates a set value.

$$u_{s1}^{ref}=(R_s^*+j\hat{\omega}\sigma L_s^*)\cdot i_s+\hat{e} \quad (5)$$

The vector relation indicated by Formula (5) is categorized into the case of electrical operation and the case of regeneration. The case of electrical operation is shown in FIG. 4, and the case of regeneration is shown in FIG. 5.

Figure 4:
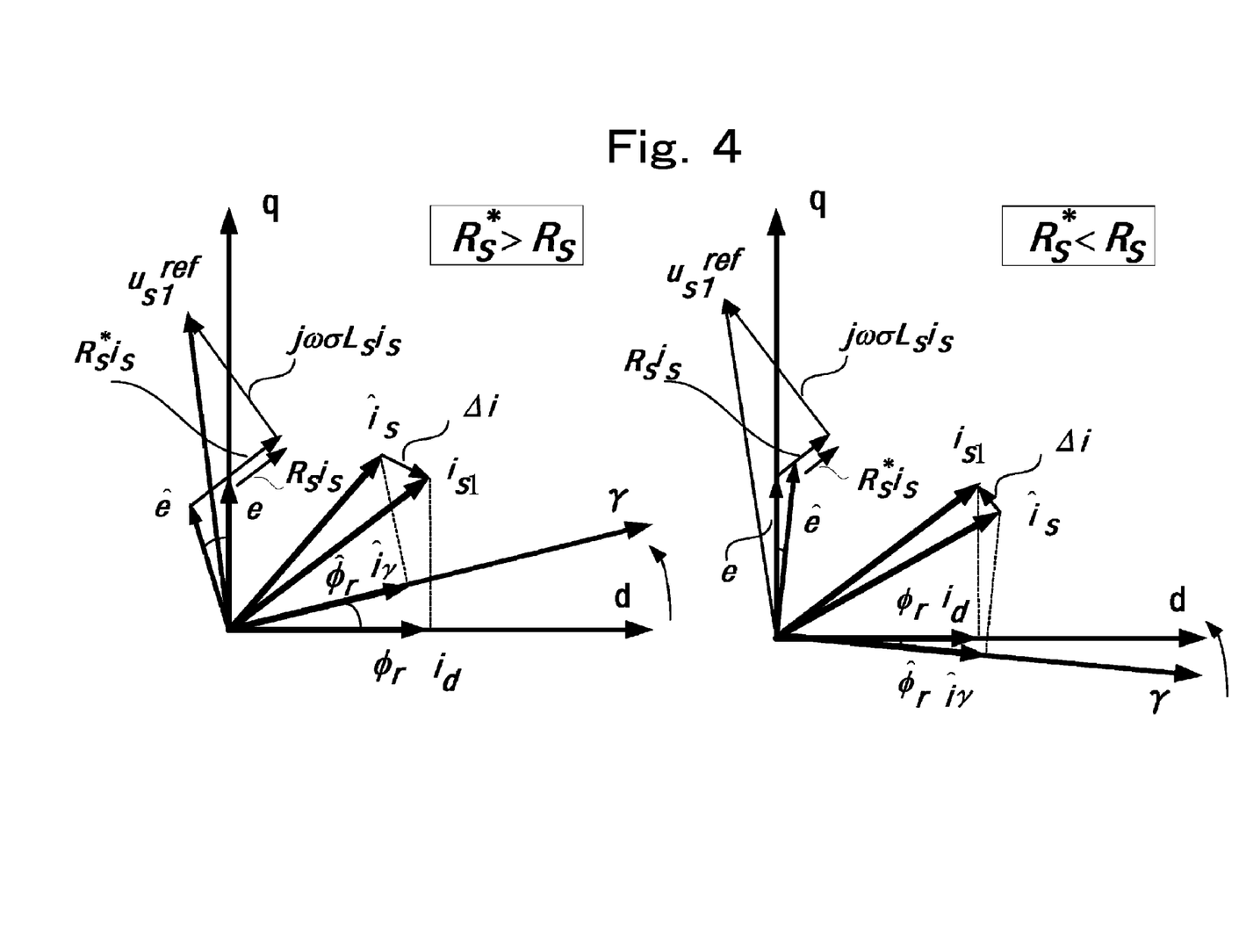
FIG. 4 illustrates a vector relation when an operating state of a motor is at electrical operation.
Figure 5:
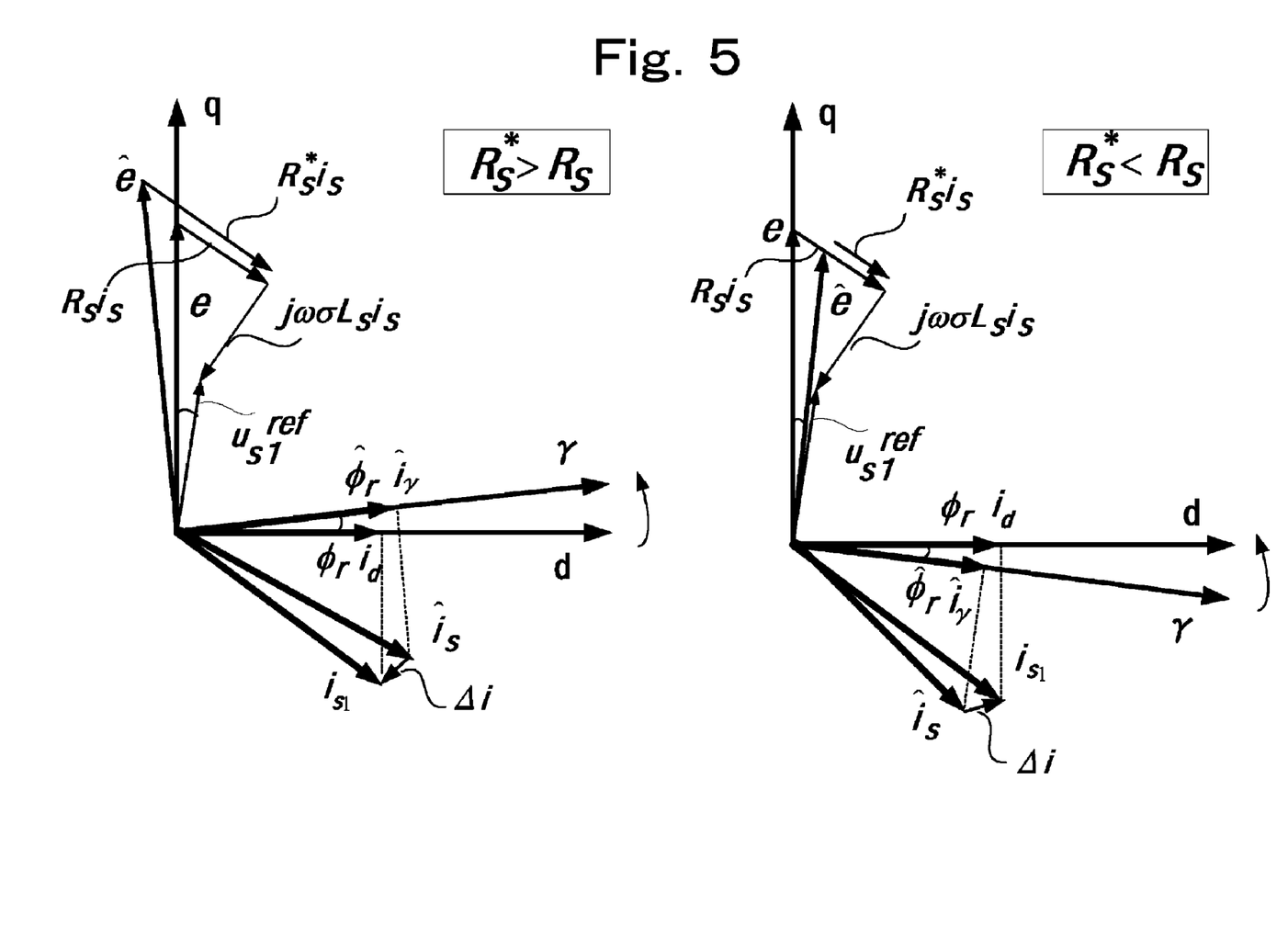
FIG. 5 illustrates a vector relation when the operating state of the motor is at regeneration.

In FIG. 4 (at electrical operation), the left side is a vector diagram showing the case where a primary resistance set value Rs* is set so as to be greater than an actual value, and the right side is a vector diagram showing the case where the primary resistance set value Rs* is set so as to be lower than the actual value. It is noted that a set value of the leakage inductance $\sigma L_s$ has a small effect in a low-velocity region, and thus the effect of the setting error thereof is omitted in FIG. 4.

With reference to the command voltage vector $u_{s1}^{ref}$, the position of an induction voltage vector e is set from an amount of impedance fall, and the estimated magnetic flux vector $\hat{\phi_r}$ is generated at a position (γ-axis) orthogonal to the induction voltage vector e.

When the primary resistance set value Rs* is set so as to be greater than the actual value, the estimated magnetic flux vector $\hat{\phi_r}$ has a leading phase with respect to an actual magnetic flux vector $\phi_r$ generated along d-axis, and the phase advances further when a load is imposed thereon. At this time, the amplitude of the estimated magnetic flux vector $\hat{\phi_r}$ becomes smaller than that of an actual magnetic flux. An exciting current component is controlled so as to have the amplitude of an estimated magnetic flux, by this vector control. Thus, the voltage vector $u_{s1}^{ref}$ is adjusted so as to be decreased. As a result, the voltage may not reach a voltage required for start-up, causing a step-out phenomenon.

On the other hand, when the primary resistance set value Rs* is set so as to be lower than the actual value, the estimated magnetic flux vector $\hat{\phi_r}$ has a lagging phase with respect to the actual magnetic flux vector $\phi_r$ generated along d-axis, and the phase lags further when a load is imposed thereon. At this time, the amplitude of the estimated magnetic flux vector $\hat{\phi_r}$ becomes larger than that of the actual magnetic flux. The exciting current component is controlled so as to have the amplitude of the estimated magnetic flux, by this vector control. Thus, the voltage vector $u_{s1}^{ref}$ is adjusted so as to be increased.

In FIG. 5 (at regeneration), the left side is a vector diagram showing the case where the primary resistance set value Rs* is set so as to be greater than the actual value, and the right side is a vector diagram showing the case where the primary resistance set value Rs* is set so as to be lower than the actual value. When the primary resistance set value Rs* is set so as to be greater than the actual value, the estimated magnetic flux vector $\hat{\phi_r}$ is adjusted such that the voltage vector $u_{s1}^{ref}$ increases. When the primary resistance set value Rs* is set so as to be lower than the actual value, the estimated magnetic flux vector $\hat{\phi_r}$ is adjusted such that the voltage vector $u_{s1}^{ref}$ decreases. Thus, the vector relation is inversed to that at electrical operation.

As described above, it is also understood, from FIGS. 4 and 5, that the effect of a setting error of the primary resistance can be observed on the basis of the magnitude of the error vector $\Delta i$ between the current vector $i_{s1}$ and the estimated current vector $\hat{i_{s1}}$ estimated by the state estimator 11, and that an amount of voltage increase or decrease of the voltage vector $u_{s1}^{ref}$ which is caused by the setting error is obtained from the scalar product of the error current vector $\Delta i$ and the estimated current vector $\Delta i$.

As described above, the error current vector $\Delta i$ between the current vector $i_{s1}$ and the estimated current vector $\hat{i_{s1}}$ is converted into the d-q coordinate system, namely, a direct current signal, by using the magnetic flux phase $\hat{\theta}$, and the scalar product of: the error current vector $\Delta i$, which has been converted into the direct current signal; and the command current vector $i_s^{ref}$, which is a direct current signal, is calculated, thereby preventing a delay of current detection and a delay of estimation calculation from influencing the correction voltage value. In addition, the vector states at electrical operation and regeneration, which are the operating states of the motor, are taken into consideration.

The control apparatus I, for an alternating current motor, in the first embodiment of the invention can suppress deterioration of control, which is caused by a temperature change and a setting error of a constant, without changing any motor parameters used in the state estimator. In addition, stable drive of the motor can be achieved even at regeneration of the motor.

Figure 6:
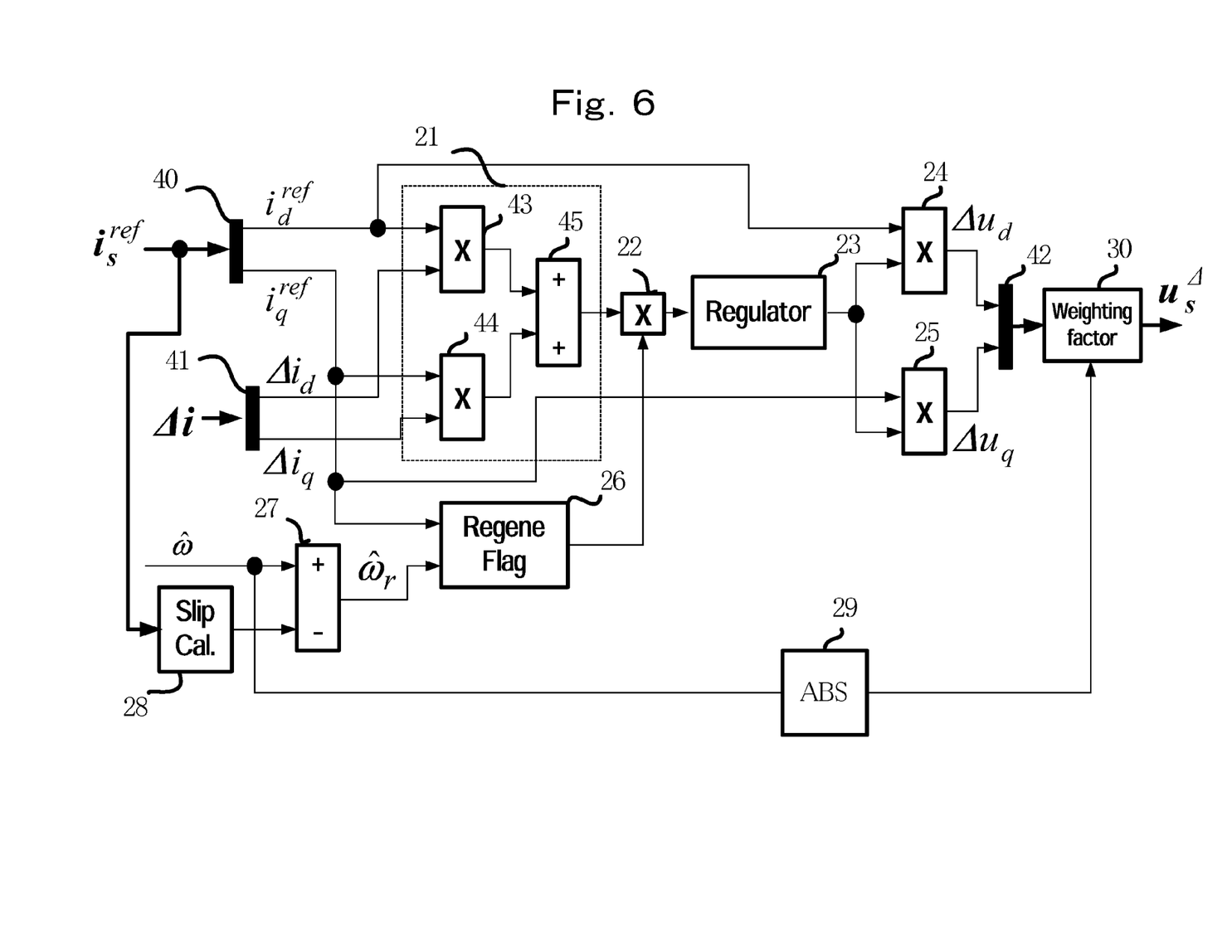
FIG. 6 is a block diagram of a correction voltage calculator according to a second embodiment.

FIG. 6 is a block diagram of a correction voltage calculator 4' according to a second embodiment.

FIG. 6 differs from FIG. 2 according to the first embodiment, in that an absolute value calculator 29 and a correction voltage vector adjuster 30 are added to the configuration of the correction voltage calculator 4 in FIG. 2. Components performing the same operations as in FIG. 2 are designated by the same reference numerals, and the description thereof is omitted.

The absolute value calculator 29 calculates the absolute value of the stator angular velocity $\hat{\omega}$. The correction voltage vector adjuster 30 limits the magnitude of the correction voltage vector $u_s^\Delta$ on the basis of the absolute value of the stator angular velocity $\hat{\omega}$, and adjusts a change amount of the correction voltage vector $u_s^\Delta$.

When the operating frequency of the motor increases, it is difficult to observe the effect caused by a set value error of the primary resistance, on the basis of an electromotive force that increases due to the operating frequency, and an effect given to motor control becomes small. Thus, the correction voltage calculator 4' is configured to limit the magnitude of the correction voltage vector $u_s^\Delta$ by using the correction voltage vector adjuster 30 and in accordance with the operating frequency.

Further, the correction voltage vector adjuster 30 is configured to have a filter element such as a first-order lag filter, thereby being able to limit a response of the correction voltage vector that overreacts due to a transient behavior of the motor.

As described above, because the magnitude and the change amount of the correction voltage vector $u_s^\Delta$ for performing correction to the voltage vector $u_{s1}^{ref}$ inputted to the state estimator 11, are limited, stable drive of the motor can be achieved.

Figure 7:
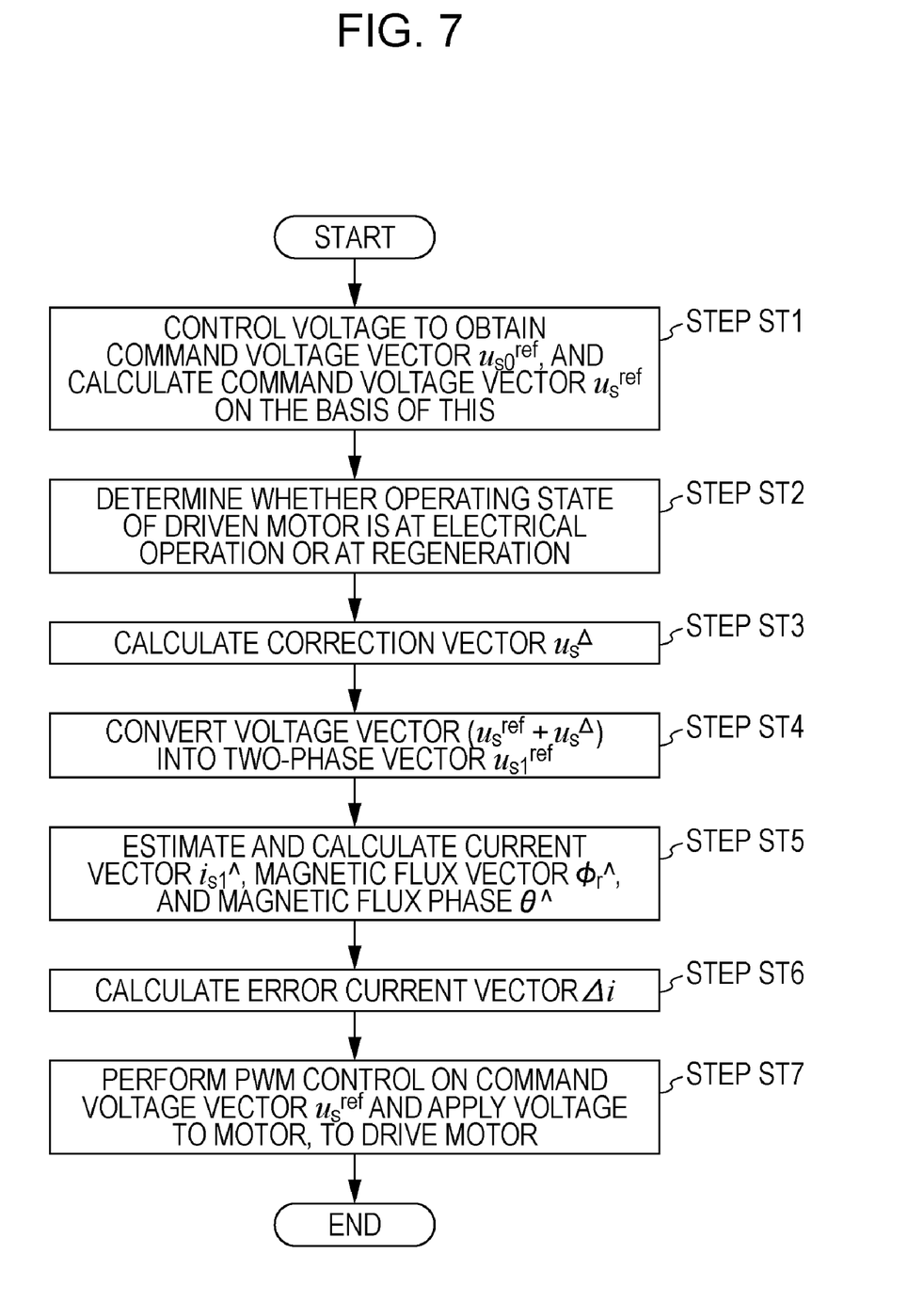
FIG. 7 is a flow chart showing a control method of an inverter control apparatus I according to a third embodiment.

FIG. 7 is a flow chart showing a control method of an inverter control apparatus according to a third embodiment. Each process step will be described.

At step ST1, current control is performed such that the command current vector $i_s^{ref}$ agrees with the actual current vector $i_{s2}$, to obtain the command voltage vector $u_{s0}^{ref}$, and the command voltage vector $u_s^{ref}$ is calculated on the basis of this.

Next, at step ST2, it is determined whether the operating state of the motor is at electrical operation or at regeneration, on the basis of the rotor angular velocity $\omega_r$ and the current $i_q^{ref}$ corresponding to the torque command current.

Next, at step ST3, by using the command current vector $i_s^{ref}$ and the later-described error current vector $\Delta i$, the sign is changed depending on whether the operating state is at electrical operation or at regeneration, and the correction voltage vector $u_s^\Delta$ is calculated.

Next, at step ST4, the voltage vector $(u_s^{ref} + u_s^\Delta)$ is converted into the voltage vector $u_{s1}^{ref}$ that is a two-phase alternating current vector, by using the later-described magnetic flux phase $\hat{\theta}$.

Next, at step ST5, the current vector $\hat{i}_{s1}$, the magnetic flux vector $\hat{\phi}_r$, and the magnetic flux phase $\hat{\theta}$ are estimated and calculated by using the driven motor parameters, the current vector $i_{s1}$, and the voltage vector $u_{s1}^{ref}$.

Next, at step ST6, the difference between the current vector $i_{s1}$ and the estimated current vector $\hat{i}_{s1}$ is calculated as the error current vector $\Delta i$.

Next, at step ST7, on the basis of the command voltage vector $u_s^{ref}$, PMW control is performed and a voltage is applied to the motor, to drive the motor.

It is noted that the specific process at each step has been described in the first or second embodiment, and thus the detailed description thereof is omitted here. The third embodiment is implemented as described above, but the process order is not limited thereto.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An inverter control apparatus comprising:
   an inverter unit that applies a voltage to an induction motor on the basis of a command voltage vector that is obtained such that a command current vector agrees with a detected current vector;
   a state estimator that estimates and calculates a current vector, a magnetic flux vector, and a magnetic flux phase of the induction motor on the basis of the detected current vector, the command voltage vector, and a motor parameter;
   an error current calculator that calculates an error current vector between the detected current vector and the estimated current vector;
   an error current converter that vector-converts the error current vector by using the magnetic flux phase;
   a correction voltage calculator that calculates a correction voltage vector by using the vector-converted error current vector and the command current vector; and
   a correction voltage unit that adds the correction voltage vector to the command voltage vector, and inputs the resultant vector to the state estimator.

2. The inverter control apparatus according to claim 1, wherein the correction voltage calculator includes:
   a scalar product calculator that calculates a scalar product of the error current vector and the command current vector;
   an electrical operation/regeneration determiner that determines an operating state of the motor;
   a correction voltage value adjuster that changes a sign of the scalar product so as to be different between at electrical operation and at regeneration, adds the scalar product, and adjusts the correction voltage value so as to have the same magnitude; and
   a multiplier that multiplies the command current vector by the correction voltage value.

3. The inverter control apparatus according to claim 2, wherein the electrical operation/regeneration determiner determines whether the operating state of the motor is at electrical operation or at regeneration, on the basis of a product of: a torque current component of the command current vector; and an estimated rotor angular velocity.

4. The inverter control apparatus according to claim 2, wherein the correction voltage calculator includes:
   an absolute value calculator that calculates an absolute value of an estimated stator angular velocity; and
   a correction voltage vector adjuster that adjusts a magnitude of the correction voltage vector.

5. The inverter control apparatus according to claim 4, wherein the correction voltage vector adjuster limits the magnitude of the correction voltage vector on the basis of the absolute value of the estimated stator angular velocity.

6. The inverter control apparatus according to claim 4, wherein the correction voltage vector adjuster adjusts a change amount of the correction voltage vector on the basis of the absolute value of the estimated stator angular velocity.

* * * * *